[12] United States Patent
Natsume

(10) Patent No.: US 7,725,219 B2
(45) Date of Patent: May 25, 2010

(54) LOCAL OPERATION REMOTE CANCELLATION AUTHORIZING METHOD AND SYSTEM UNDER REMOTE OPERATION

(75) Inventor: Mitsuyoshi Natsume, Hekinan (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 1015 days.

(21) Appl. No.: 11/448,736

(22) Filed: Jun. 8, 2006

(65) Prior Publication Data

US 2006/0294429 A1 Dec. 28, 2006

(30) Foreign Application Priority Data

Jun. 22, 2005 (JP) .............................. 2005-182458

(51) Int. Cl.
*G05D 1/00* (2006.01)
(52) U.S. Cl. .......................................... 701/2
(58) Field of Classification Search ...................... 701/2, 701/20; 180/287
See application file for complete search history.

(56) References Cited

FOREIGN PATENT DOCUMENTS

| JP | 2003-296860 | 10/2003 |
|---|---|---|
| JP | 2004-102940 | 4/2004 |
| JP | 2004-362159 | 12/2004 |

*Primary Examiner*—Kim T Nguyen
(74) *Attorney, Agent, or Firm*—Nixon & Vanderhye PC

(57) ABSTRACT

When a local operation is carried out on a vehicle, a local operation record is stored in a storage section of a remote operation control master unit and a storage section of a smart entry key. When a remote operation of canceling the local operation is carried out, the local operation record stored in the smart entry key is transmitted to the vehicle through a cellular phone. The local operation record received by an in-vehicle communication device is compared with the local operation record stored in the storage section of the remote operation control master. When the comparison result indicates the agreement between the local operation records, the authority for canceling the local operation is given.

21 Claims, 4 Drawing Sheets

FIG. 2
| ID | OPERATION CONTENT | DATE AND TIME |
FIG. 3
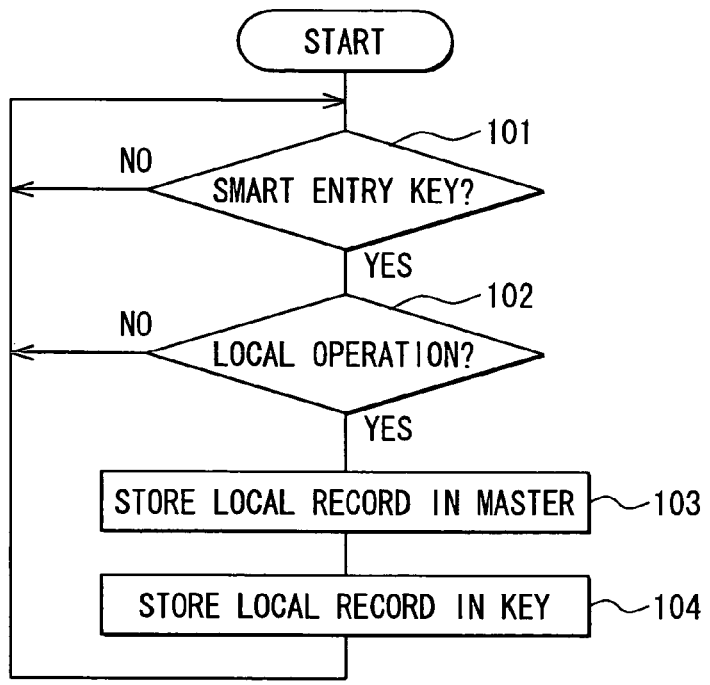
FIG. 4
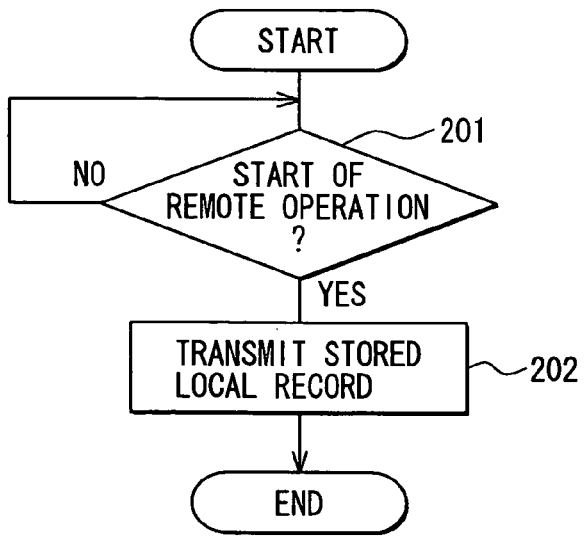

LOCAL OPERATION REMOTE CANCELLATION AUTHORIZING METHOD AND SYSTEM UNDER REMOTE OPERATION

CROSS REFERENCE TO RELATED APPLICATION

This application is based on and incorporates herein by reference Japanese Patent Application No. 2005-182458 filed on Jun. 22, 2005.

FIELD OF THE INVENTION

The present invention relates to local operation/remote cancellation authorizing method and system, and particularly to method and system for authorizing cancellation of a local operation by a remote operation e.g., when a local operation executed on a vehicle is canceled by a remote operation.

In a remote notification service, when an abnormality such as an unexpected start of an engine, a forced opening of a door or the like occurs in a vehicle, this abnormality is notified to a user by mail, a telephone call or the like. In addition, in a remote operation service, a user (e.g., an owner of a vehicle or a person who is allowed to use the vehicle) carries out an operation such as on/off engine start, turn-on/turn-off of a hazard light, lock/unlock of doors, opening/closing of windows or the like on the vehicle by means of a remote operating unit such as a cellular phone or the like from a remote place.

The operations such as the on/off engine start, the turn-on/turn-off of the hazard light, the lock/unlock of the doors, the opening/closing of the windows, etc. on the vehicle are also carried out with intention by a person (local operator) who actually gets in a vehicle and drives the vehicle, and thus persons other than the local operator concerned should not cancel the operations (local operations) which are locally carried out by the local operator. However, with respect to a vehicle for which remote operation is allowed, local operations are allowed to be canceled irrespective of the intention of the local operator through an operation (remote operation) by a person (remote operator) such as the owner of the vehicle or the like at a remote place away from the vehicle. Therefore, even in a situation that the local operation must be continued, the local operation is allowed to be canceled by the remote operation (e.g., JP-A-2004-102940).

However, it is impossible for a remote operator at a remote place to cancel the local operation under the condition that the remote operator understands the local operator's intention. Thus, various drawbacks will occur if cancellation of the local operation through the remote operation is allowed without limitation.

For example, in one case, a vehicle owner's spouse carries out a local operation of turning on the start of an engine with an intention of using the vehicle early in the morning in winter, but the owner of the vehicle carries out a remote operation of turning off the start of the engine from a remote place because he does not use the vehicle in the morning. The wife who is about to go out cannot use the vehicle with the engine warmed up sufficiently.

Furthermore, when a local operation of turning on a hazard light of a vehicle is carried out, a local operator recognizes that the vehicle is under an abnormal state and thus carries out the local operation of turning on of the hazard light with an intention of preventing any person from carelessly approaching the vehicle. Accordingly, if the owner of the vehicle turns off the hazard light from a remote place by the remote operation without understanding the abnormal situation, some disadvantage may arise. Particularly when the hazard light is turned on, there may be a legal provision of prohibiting any person other than the person turning on the hazard light from turning off the hazard light. Therefore, this cancellation by the remote operation will result in violation of the regulation.

SUMMARY OF THE INVENTION

An object of the present invention is to provide a local operation cancellation authorizing method and system, in which only a local operator is authorized to cancel a local operation when an attempt is made to cancel the local operation by a remote operation.

According to an aspect of the present invention, a local operation record is stored in a vehicle and a portable unit, when a local operation is carried out in a vehicle. The local operation record stored in the portable unit is transmitted to the vehicle, when a remote operation for canceling the local operation is carried out by a remote unit. An authority for canceling the local operation is given, when the local operation records transmitted from the portable unit and stored in the vehicle are in agreement, by comparing the local operation records.

BRIEF DESCRIPTION OF THE DRAWINGS

The above and other objects, features and advantages of the present invention will become more apparent from the following detailed description made with reference to the accompanying drawings. In the drawings:

FIG. 2 is a table showing an example of a local operation record stored in a storage section of a remote operation control master and a storage section of a smart entry key shown in FIG. 1;

FIG. 3 is a flowchart showing the operation under local operation of the remote operation control master of FIG. 1;

FIG. 4 is a flowchart showing the operation of a remote communication operation unit;

DETAILED DESCRIPTION OF THE PREFERRED EMBODIMENTS

First Embodiment

Figure 1:
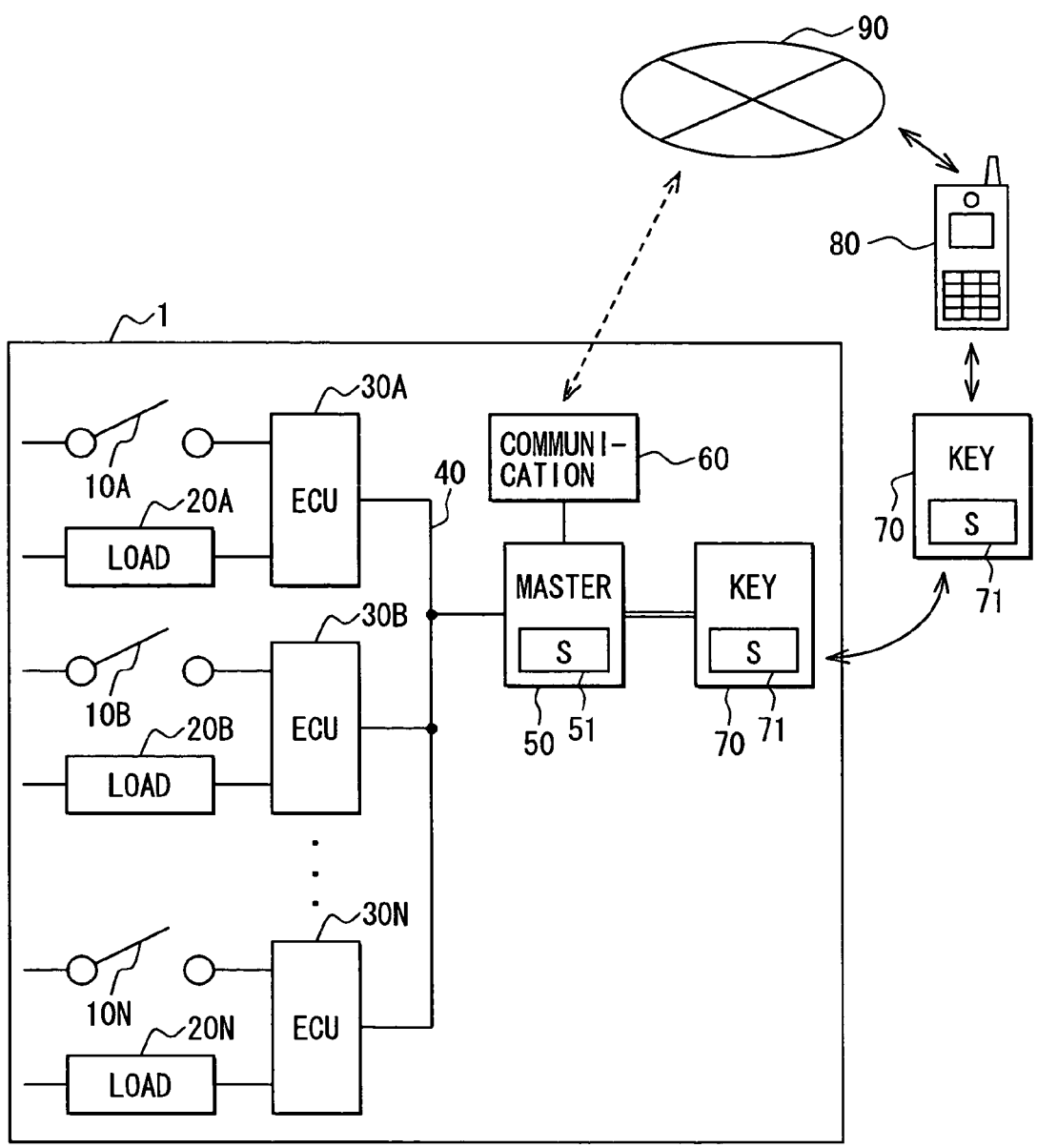
FIG. 1 is a block diagram showing a local operation cancel authorizing system under remote operation according to a first embodiment.
Figure 5:
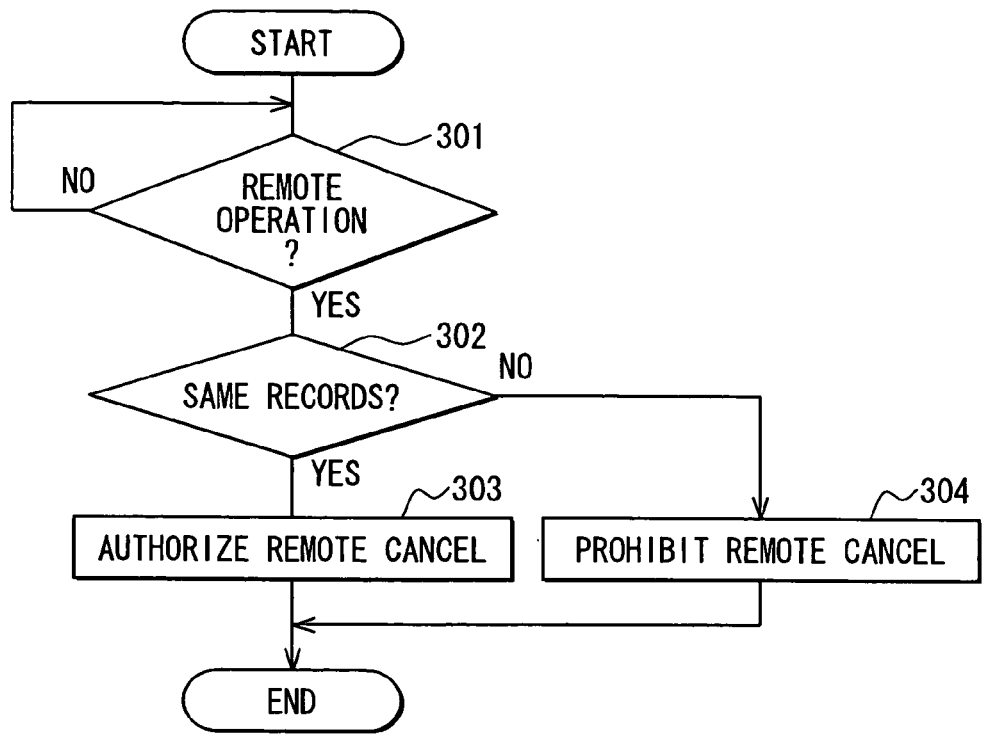
FIG. 5 is a flowchart showing the operation under remote operation of the remote operation control master of FIG. 1.

Referring first to FIG. 1, a local operation cancellation authorizing system under remote operation is constructed with plural local operation switches 10A, 10B, . . . , 10N, plural electric loads 20A, 20B, . . . , 20N, plural electric control units 30A, 30B, ..., 30N, an in-vehicle local area network (LAN) 40, a remote operation control master 50 and an in-vehicle communication device 60. Those are provided in a vehicle 1. The system is further constructed with a smart entry key 70, a cellular phone 80 and a communication network 90, which are provided outside the vehicle 1. The smart entry key 70 and the cellular phone 80 are carried by a user, etc. and hence are brought into the vehicle 1 when the user is in the vehicle 1.

The local operation switches 10A, 10B, ..., 10N may be ON/OFF switches for a start of the engine, a turn-on/turn-off switch of a hazard light, a lock/unlock switch of doors, an open/close switch of windows, etc. They are connected to the respective electric control units 30A, 30B, ..., 30N corresponding to an engine system, a body system, a security system, etc.

The electrical loads 20A, 20B, ..., 20N may be a fuel injector of the engine, a hazard light, a door lock motor, a window motor, etc., in which the ON/OFF is controlled by the local operation switches 10A, 10B, ..., 10N.

The electrical control units 30A, 30B, ..., 30N are respectively provided for every function of the engine system, the body system, the security system, etc., and they are connected to the in-vehicle LAN 40 to mutually communicate with one another.

The in-vehicle LAN 40 may be constructed by wires or optical fibers, and a communication system such as a body electronic area network (BEAN), a controller area network (CAN), a media oriented system transport (MOST), a local interconnect network (LIN) or the like may be used.

The remote operation control master 50 is a device for relating the ECUs 30A, 30B, ..., 30N and the in-vehicle communication device 60, and is equipped with a storage section (S) 51 for storing a local operation record. The remote operation control master 50 may be installed in any one of the electric control units 30A, 30B, ..., 30N.

A data communication module (DCM) of a code division multiple access (CDMA) system or the like may be assumed for the in-vehicle communication device 60. However, a cellular phone device or the like provided separately from the cellular phone 80 may be used.

The smart entry key 70 is a mobile terminal used for an electronic key system that can control the lock mechanism of each door, etc. of the vehicle 1 from a place away from the vehicle 1. Each of the owner of the vehicle and the persons (for example, family) who are allowed to drive the vehicle by the owner of the vehicle owns the smart entry key 70. The smart entry key 70 is equipped with a transmitting/receiving circuit therein. Identification codes (IDs, terminal identification information) each of which is specifically assigned every smart entry key 70 is stored in the transmitting/receiving circuit, and the ID code is output to the electronic control unit 30 of the security system. The smart entry key 70 is connectable to the remote control master 50 through communication wires or short-range wireless communication (or wired communication) such as Bluetooth (registered trademark) or the like, and performs a keyless door opening/closing function, a keyless immobilizer function, a keyless engine starter function, etc. Furthermore, the smart entry key 70 is equipped with a storage section 71 for storing a local operation record.

As well known, the cellular phone 80 has input keys, a liquid crystal display, a wireless circuit, etc. It communicates with the in-vehicle wireless communication device 60 through a communication network 90. Furthermore, the cellular phone 80 contains a communicating section (not shown) adapted to a communication standard such as Bluetooth using 2.4 GHz band or the like. It is designed so that it can execute short-distance wireless communication with the smart entry key 70. The cellular phone 80 may be an Internet Protocol (IP) cellular phone for transmitting data in packets, etc. through the wireless local area network (LAN) via the Internet.

The connection between the smart entry key 70 and the cellular phone 80 is not limited to the communication section that can perform the short-distance wireless communication. For example, it may be a communicating section for wired connection or direct connection. The communication network 90 is not limited to the cellular phone network, but it may be the Internet using IP (Internet Protocol), a public telephone network or the like.

The local operation record stored in the storage section 51 of the remote operation control master 50 and the storage section 71 of the smart entry key 70 may be formatted as shown in FIG. 2. The local operation record includes the ID code of the smart entry key 70, the operation content of the local operation and the date and time of the local operation. With respect to the local operation record, in the case of the same operation content, the operation content of the latest date and time is overwritten and stored. The reason for this is as follows. That is, when the vehicle owner turns on the hazard light by the local operation and then the owner's spouse also takes the precaution of turning on the hazard light again by the local operation, the vehicle owner is prohibited from using his discretion in canceling the turn-on of the hazard light from a remote place by the remote operation.

In operation, when a user (owner of the vehicle 1 or a person who is allowed to use the vehicle 1 by the owner) gets into a vehicle 1 while owning the smart entry key 70, the remote operation control master 50 connects to the smart entry key 70 by short-distance wireless communication (or wired communication) such as Bluetooth (registered trademark) or the like (Yes at step 101). Specifically, the remote operation control master 50 in the vehicle 1 and the smart entry key 70 carried into the vehicle 1 communicate with each other at all times.

When the user-recognized connection state of the smart entry key 70 (the state that the user is in the vehicle 1), for example, turns on the hazard switch serving as the local operation switch for turning on the hazard light (Yes at step 102), the remote operation control master 50 stores into the storage section 51 of the remote operation control master 50 the local operation record when the local operation is carried out on the vehicle 1 (step 103). Specifically, the remote operation control master 50 stores the ID code of the smart entry key 70, the operation content of the local operation (turn-on of the hazard light) and the date and time as the local operation record into the storage section 51 of the remote operation control master 50. When the local operation record of the same operation content has been already stored, the operation content is overwritten on the old operation content so that only the latest local operation record is maintained in the storage section 51.

Next, the remote operation control master 50 instructs the storage section 71 of the smart entry key 70 to store the same local operation record (step 104). Specifically, the ID code of the smart entry key 70, the operation content (turn-on of the hazard light) of the local operation and the date and time of the local operation are stored as the local operation record into the storage section 71 of the smart entry key 70. When the local operation record of the same operation content has been already stored, the operation content is overwritten on the old operation content so that only the latest local operation record is maintained in the storage section 71.

Thereafter, the remote operation control master 50 repeats the steps 103 and 104 insofar as the local operation is repeated under the user-recognized connection state of the smart entry key 70.

Subsequently, when the user (that is, the local operator) gets out of vehicle 1 while possessing the smart entry key 70, the remote operation control master 50 is disconnected from the smart entry key 70 through the wireless communication or the wired communication (No at step 101).

When the user wishes to cancel the local operation (turn-on of the hazard light) by the remote operation from outside of the vehicle 1 (Yes at step 201), the local operation concerned being carried out by the user when he/she was in the vehicle, the user transmits the local operation record stored in the storage section 71 of the smart entry key 70 through the communication network 90 to the vehicle 1 by using his/her own cellular phone 80 (step 202).

When the local operation record is received through the in-vehicle communication device 60 at the vehicle 1 (Yes at step 301), the remote operation control master 50 compares the received local operation record with the local operation record stored in the storage section 51 of the remote operation control master 50 to determine whether both the local operation records are in coincidence with each other (step 302).

If the comparison result indicates that both the local operation records are in coincidence with each other, the remote control master 50 determines that the local operator has requested the remote operation of canceling that local operation, and gives the authority for canceling the local operation to the cellular phone 80 (step 303).

If the comparison result indicates that both the local operation records are not in coincidence with each other, the remote operation control master 50 determines that a person other than the local operator has requested the remote operation of canceling the local operation, and prohibits the remote cancel operation (step 304). That is, the master 50 does not give any authority for remotely canceling the local operation to the cellular phone 80.

Figure 6:
FIG. 6 is a table showing another example of the local operation record stored in the storage section of the remote operation control master and the storage section of the smart entry key.

The local operation record may have information other than the three record items (fields) such as the ID code, the operation content and the date and time shown in FIG. 2. For example, when storing items of the local operation record are set to only the operation content of the local operation and the date and time of the local operation as shown in FIG. 6, it may be hard to check whether the local operation record is the local operation record stored in the storage section 71 of the smart entry key 70 of the local operator. However, there is little probability that the local operations having the same operation content are carried out at the same date and time. Accordingly, by merely making the coincidence determination in the operation content and operation date and time of the local operation, it can be also found that the request is a remote operation request for canceling the local operation by the local operator.

Figure 7:
FIG. 7 is a table showing another example of the local operation record stored in the storage section of the remote operation control master and the storage section of the smart entry key.

Likewise, when storing items of the local operation record are set to only the ID code of the smart entry key 70 and the operation content of the local operation as shown in FIG. 7, it may become hard to check whether both the local operation records have the local operations carried out at the same date and time. However, there is little probability that the same local operator carries out local operations having the same operation content. Accordingly, by merely making the coincidence determination in the ID code of the smart entry key 70 and the operation content of the local operation, it can be also found that the request is a remote operation request for canceling the local operation by the local operator.

Figure 8:
FIG. 8 is a table showing another example of the local operation record stored in the storage section of the remote operation control master and the storage section of the smart entry key.

Furthermore, when the storing items of the local operation record are set to only the ID code of the smart entry key 70 and the date and time of the local operation as shown in FIG. 8, it may become hard to check whether the local operation record is a local operation record of the local operation having the same operation content. However, there is little probability that the local operations having the different operation contents are carried out at the same date and time. Accordingly, by merely making the coincidence determination in the ID code of the smart entry key 70 and the date and time of the local operation, it can be also found that the request is a remote request for canceling the local operation by the local operator from a remote place.

Second Embodiment

Figure 9:
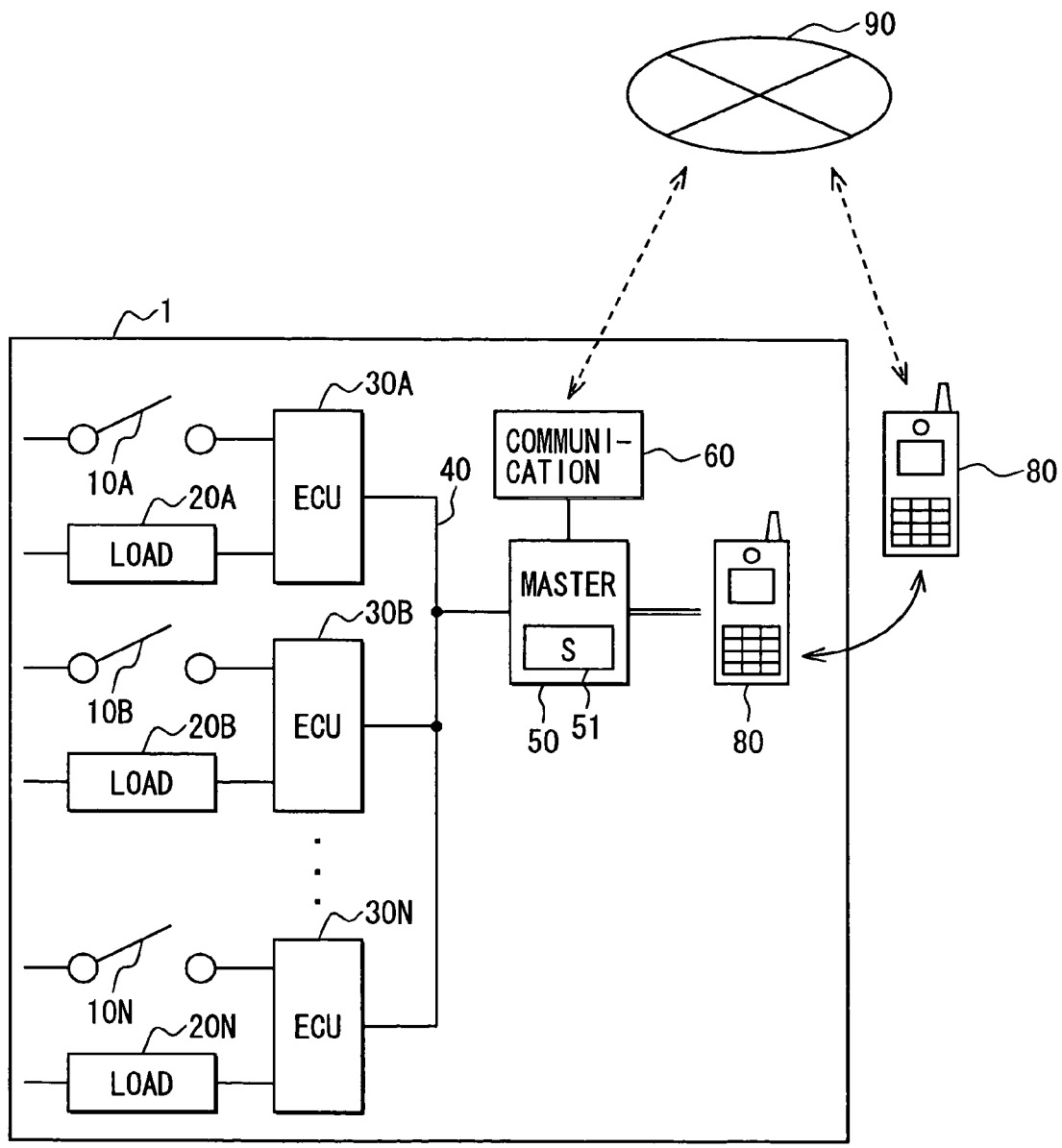
FIG. 9 is a block diagram showing a local operation cancel authorizing system under remote operation according to a second embodiment.

According to a second embodiment shown in FIG. 9, the smart entry key 70 in the first embodiment (FIG. 1) is replaced with the cellular phone 80 itself. The cellular phone 80 is equipped with a rewritable storage section (not shown) such as a flash ROM or the like therein. The operation of the second embodiment is substantially similar to the operation of the first embodiment.

Specifically, when the user (the owner of the vehicle or a person who is allowed to use the vehicle 1 by the owner) gets into the vehicle 1 while holding the cellular phone 80, the remote operation control master 50 connects to the cellular phone 80 through wireless or wired communication (Yes at step 101 in FIG. 3).

When the user turns on, for instance, the hazard switch corresponding to the local operation switch for turning on the hazard light under the state that the user has the smart entry key 70 or the like (that is, under the state that it is recognized that the user gets in the vehicle) (Yes at step 102), the remote operation control master 50 stores the cellular phone number (terminal identification information) of the cellular phone 80, the operation content (turn-on of the hazard light) of the local operation, and the date and time, as the local operation record into the storage section 51 of the remote operation control master 50 (step 103 in FIG. 3).

Next, the remote operation control master 50 instructs storage of the cellular phone number of the cellular phone 80, the operation content (turn-on of the hazard light) of the local operation, and the date and time, as the local operation record into the storage section of the cellular phone 80 (step 104).

Thereafter, the remote operation control master 50 repeats the steps 103 and 104 insofar as the local operation is repeated under the connection state of the cellular phone 80.

Subsequently, when the user (that is, the local operator) gets out of vehicle 1 while having the cellular phone 80, the remote operation control master 50 is disconnected from the cellular phone 80 through the wireless or wired communication (No at step 101).

When the user wishes to remotely cancel the local operation (the turn-on of the hazard light), which was carried out when the user got in the vehicle 1, from the outside of the vehicle 1 by the remote cancel operation (step 201), the user transmits the local operation record stored in the storage section of the cellular phone 80 to the vehicle 1 through the communication network 90 using the cellular phone 80 (step 202).

When the local operation record concerned is received through the in-vehicle communication device 60 at the vehicle 1 (Yes at step 301), the remote operation control master 50 compares the received local operation record with the local operation record stored in the storing portion 51 of the remote operation control master 50 (step 302).

If the comparison result indicates coincidence between the local operation records, the remote operation control master 50 authorizes the user to cancel the local operation (step 303).

If the comparison result indicates non-coincidence between the local operation records, the remote operation control master 50 prohibits or does not authorize the user to cancel the local operation (step 304).

In the second embodiment, the cellular phone 80 serves as both a portable storage unit and a remote operating unit. However, for example, a personal digital assistance (PDA), a personal computer (PC), etc. which can connect to the communication network 90 may be used in place of the cellular phone 80.

Furthermore, the cellular phone 80 is connected to the in-vehicle communication device 60 through the communication network 90 to transmit/receive the local operation record. However, in this communication style, the local operation record may be transmitted/received further via a relay device called an information center.

Still furthermore, by giving maximum level authority for remotely canceling the local operation to a specific smart entry key 70, the cellular phone 80 or the like which serves as both the portable storage unit and the remote operating unit, these elements are given the authority for canceling the local operation even when the comparison result of the local operation records indicates non-coincidence. In this case, when a matter of urgency such as accident rescue, maintenance or the like occurs, the local operation can be canceled by a person who is not the local operator.

Further modification and alterations are also possible in the above embodiments.

What is claimed is:

1. A method for authorizing remote cancellation of a user-selected local operation previously made to a user-selected one of plural devices by a user in a vehicle, the method comprising:

storing a user-selected local operation record in the vehicle and a portable storage unit corresponding to a user-selected one of plural possible local operations when a user-selected local operation is carried out by the user in the vehicle with the portable storage unit located in the vehicle;

transmitting the user-selected local operation record stored in the portable storage unit to the vehicle when the remote cancellation operation for canceling the user-selected local operation is attempted by a remote operating unit; and giving authority for canceling the user-selected local operation when the user-selected local operation record transmitted from the portable storage unit and the user-selected local operation record stored in the vehicle are in agreement as determined by comparing the local operation records.

2. The method according to claim 1, wherein:
   the storing step stores the user-selected local operation record in a storage section of a remote operation control master device provided in the vehicle as the user-selected local operation record stored in the vehicle.

3. The method according to claim 2, further comprising:
   coupling the portable storage unit and the remote operation control master device through radio communication or wire communication when the portable storage unit is located in the vehicle.

4. The method according to claim 3, wherein:
   the portable storage unit is a smart entry key having a storage section for storing the user-selected local operation record therein; and
   the remote operating unit is a cellular phone.

5. The method according to claim 3, wherein:
   the portable storage unit and the remote operating unit are provided by a cellular phone having a storage section for storing the user-selected local operation record therein.

6. The method according to claim 1, wherein:
   the user-selected local operation record includes data representing the user-selected local operation and a date and time of the user-selected local operation.

7. The method according to claim 1, wherein:
   the user-selected local operation record includes data representing terminal identification of the remote operating unit and the user-selected local operation.

8. The method according to claim 1, wherein:
   the user-selected local operation record includes data representing terminal identification of the remote operating unit and a date and time of the user-selected local operation.

9. The method according to claim 1, wherein:
   the user-selected local operation record includes data representing terminal identification of the remote operating unit, the user-selected local operation and a date and time of the user-selected local operation.

10. The method according to claim 1, wherein:
    the giving authority step gives authority for canceling the user-selected local operation if the remote operating unit is a specified one having a highest level of local operation canceling authority, even when the local operation record transmitted from the portable storage unit and that stored in the vehicle are in disagreement.

11. A system for authorizing remote cancellation of a user-selected local operation previously made to a user's selection of one of plural devices in a vehicle, the system comprising:

a movable communication unit configured to store a user-selected local operation record therein when one of plural possible user-selected local operations is carried out by a user in a vehicle, and to transmit the user-selected local operation record to the vehicle when a remote cancellation operation for canceling the user-selected local operation is attempted, the movable communication unit being movable with a user of the vehicle; and a remote control master unit configured to store the user-selected local operation record therein when the user-selected local operation is carried out in the vehicle, and to give authority for canceling the user-selected local operation when the user-selected local operation record transmitted from the movable communication unit and the user-selected local operation record stored in the remote control master unit are in agreement as determined by comparing the user-selected local operation records.

12. The system according to claim 11, wherein the movable communication unit includes:
    a portable storage unit for storing the user-selected local operation record when the user-selected local operation is carried out in the vehicle; and
    a remote operating unit for transmitting the user-selected local operation record stored in the portable storage unit to the vehicle.

13. The system according to claim 12, further comprising:
    an in-vehicle communication unit for receiving the user-selected local operation record transmitted from the remote operating unit,
    wherein the portable storage unit is coupled to the remote control master unit by radio communication or wire communication to store the user-selected local operation record when located in the vehicle, wherein the remote operating unit is coupled to the portable storage unit through radio communication or wire communication to transmit the user-selected local operation record stored in the portable storage unit to the vehicle when the remote operation is carried out, and wherein the remote control master unit stores the user-selected local operation record in a storage section thereof and in the portable storage unit when the local operation is carried out, and compares the user-selected local operation record received through the in-vehicle communication unit and that stored in the storage section.

14. The system according to claim 11, further comprising:

an in-vehicle communication unit for receiving the user-selected local operation record transmitted from the remote operating unit, wherein the movable communication unit is coupled to the remote control master unit by radio communication or wire communication to store the user-selected local operation record in a storage section thereof when located in the vehicle, and wherein the remote control master unit stores the user-selected local operation record in a storage section thereof when the user-selected local operation is carried out, and compares the local operation record received through the in-vehicle communication unit and that stored in the storage section.

15. The system according to claim 12, further comprising:

an in-vehicle communication unit for receiving the user-selected local operation record transmitted from the remote operating unit, wherein the portable storage unit is a smart entry key coupled to the remote control master unit by radio communication or wire communication to store the user-selected local operation record in a storage section thereof when located in the vehicle, wherein the remote operating unit is a cellular phone coupled to the portable storage unit through radio communication or wire communication to transmit the user-selected local operation record stored in the storage section of the smart entry key to the vehicle when the remote operation is carried out, and wherein the remote control master unit compares the user-selected local operation record received through the in-vehicle communication unit and that stored in the storage section thereof.

16. The system according to claim 11, further comprising:

an in-vehicle communication unit for receiving the user-selected local operation record transmitted from the movable communication unit, wherein the movable communication unit is a cellular phone, which is coupled to the remote control master unit by radio communication or wire communication to store the user-selected local operation record in a storage section thereof when located in the vehicle, and which transmits the user-selected local operation record stored therein.

17. The system according to claim 11, wherein:

the user-selected local operation record includes data representing the user-selected local operation and a date and time of the user-selected local operation.

18. The system according to claim 11, wherein:

the user-selected local operation record includes data representing terminal identification of the movable communication unit and the user-selected local operation.

19. The system according to claim 11, wherein:

the user-selected local operation record includes data representing terminal identification of the movable communication unit and a date and time of the user-selected local operation.

20. The system according to claim 11, wherein:

the user-selected local operation record includes data representing terminal identification of the movable communication unit, the local operation and a date and time of the local operation.

21. The system according to claim 11, wherein:

the remote control master unit gives authority for canceling the user-selected local operation if the movable communication unit is a specified one having a highest level of local operation canceling authority, even when the local operation record transmitted from the movable communication unit and that stored in the vehicle are in disagreement.

* * * * *